(12) United States Patent
Ito

(10) Patent No.: US 6,800,842 B2
(45) Date of Patent: Oct. 5, 2004

(54) OPTICAL ENCODER AND SENSOR HEAD OF THE SAME

(75) Inventor: Takeshi Ito, Hino (JP)

(73) Assignee: Olympus Corporation, Tokyo (JP)

( * ) Notice: Subject to any disclaimer, the term of this patent is extended or adjusted under 35 U.S.C. 154(b) by 58 days.

(21) Appl. No.: 10/356,192

(22) Filed: Jan. 31, 2003

(65) Prior Publication Data

US 2004/0036017 A1 Feb. 26, 2004

(30) Foreign Application Priority Data

Jan. 31, 2002 (JP) ........................................ 2002-024482

(51) Int. Cl.$^7$ .............................................. G01D 5/34
(52) U.S. Cl. ............................. 250/231.13; 250/231.14
(58) Field of Search ....................... 250/231.13, 231.14, 250/231.15–231.19; 341/11, 13, 31; 356/614

(56) References Cited

U.S. PATENT DOCUMENTS 5,841,133 A * 11/1998 Omi ....................... 250/231.13
6,093,928 A * 7/2000 Ohtomo et al. ......... 250/231.13
6,713,756 B2 * 3/2004 Yamamoto et al. ..... 250/231.13

* cited by examiner

Primary Examiner—Stephone B. Allen
Assistant Examiner—Patrick J. Lee
(74) Attorney, Agent, or Firm—Scully, Scott, Murphy & Presser

(57) ABSTRACT

The present invention is directed to a sensor head which constitutes an optical encoder in combination with a movable scale. The scale has a first optical pattern and a second optical pattern. The sensor head comprises a light source which emits a coherent light beam applied to the scale, a first photo-detector which detects the light reflected by the first optical pattern, and a second photo-detector which detects the light reflected by the second optical pattern. A straight line connecting the center of the first photo-detector with the center of the second photo-detector crosses both a first axis parallel to a movement direction of the scale and a second axis orthogonal to the first axis and parallel to a pattern surface of the scale.

37 Claims, 11 Drawing Sheets

OPTICAL ENCODER AND SENSOR HEAD OF THE SAME

CROSS-REFERENCE TO RELATED APPLICATIONS

This application is based upon and claims the benefit of priority from the prior Japanese Patent Application No. 2002-24482, filed Jan. 31, 2002, the entire contents of which are incorporated herein by reference.

BACKGROUND OF THE INVENTION

1. Field of the Invention

The present invention relates to an optical encoder, and more particularly to an optical linear encoder.

2. Description of the Related Art

Currently, on the stage of a machine tool or a three-dimensional measuring instrument, an optical or magnetic type encoder is utilized in order to detect a displacement magnitude in a linear direction.

The optical encoder is of a non-contact type with high accuracy and high resolution, and is utilized in various fields because it is superior in electro-magnetic radiation resistance. In particular, in encoders requiring high accuracy/high resolution, the optical type forms the mainstream.

The optical encoder generally comprises a scale fixed to a displacement measurement target on a stage or the like, and a sensor head for detecting a displacement of the scale. The sensor head includes a light source portion, which emits light onto the scale, and a light detection portion for detecting the light that has passed through the scale, i.e., the light that has been transmitted through the scale or the light that has been reflected/diffracted on the scale. A quantity of movement of the scale is calculated in a signal processing circuit or the like connected to the sensor head based on a change in a signal detected by the photo-detector portion.

Usually, in the optical linear encoder, there is used either the scale including a displacement detection pattern and a reference position detection pattern that are formed on respective tracks, or the scale including a displacement detection pattern and a reference position detection pattern that are formed on a signal track. The scale to be used is determined depending on an intended use or conditions of a target device or the like to which the optical linear encoder is assembled.

BRIEF SUMMARY OF THE INVENTION

According to one aspect of the present invention, the present invention is directed to a sensor head, which constitutes an optical encoder in combination with a movable scale including a first optical pattern and a second optical pattern. The sensor head of the present invention comprises a light source for projecting a coherent light beam onto a scale, a first photo-detector for detecting the light reflected by the first optical pattern, and at least a second photo-detector for detecting the light reflected by the second optical pattern. A straight line connecting the center of the first photo-detector with the center of the second photo-detector crosses both an x axis parallel to a movement direction of the scale and a y axis orthogonal to the x axis and parallel to a pattern surface of the scale. More preferably, the first photo-detector and the second photo-detector are arranged so that a projection of the first photo-detector projected onto a yz plane orthogonal to the x axis and a projection of the second photo-detector projected onto the same are apart from each other, and a projection of the first photo-detector projected onto a zx plane orthogonal to the y axis and the projection of the second photo-detector projected onto the same are apart from each other.

According to another aspect of the present invention, the present invention is directed to an optical encoder. The optical encoder of the present invention comprises a movable scale, and a sensor head for detecting movement of the scale. The scale includes a first optical pattern and a second optical pattern. The sensor head includes a light source for emitting a coherent light beam applied to the scale, a first photo-detector for detecting the light reflected by the first optical pattern, and at least a second photo-detector for detecting the light reflected by the second optical pattern. A straight line connecting the center of the first photo-detector with the center of the second photo-detector crosses both an x axis parallel to a movement direction of the scale and a y axis orthogonal to the x axis and parallel to a pattern surface of the scale. More preferably, the first photo-detector and the second photo-detector are arranged so that a projection of the first photo-detector projected onto a yz plane orthogonal to the x axis and a projection of the second photo-detector projected onto the same are apart from each other, and a projection of the first photo-detector projected onto a zx plane orthogonal to the y axis and the projection of the second photo-detector projected onto the same are apart from each other.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments according to the present invention will now be described with reference to the accompanying drawings hereinafter.

First Embodiment

Figure 1:
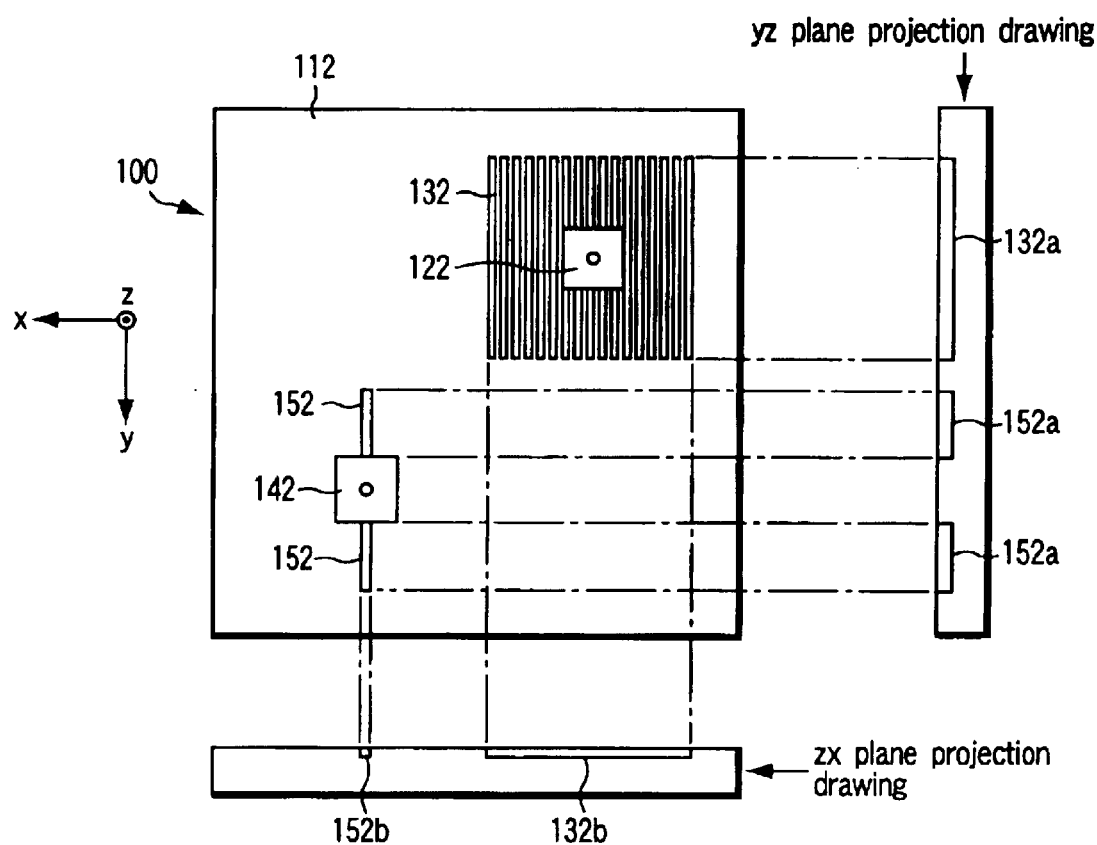
FIG. 1 shows a sensor head of an optical linear encoder according to a first embodiment of the present invention.

FIG. 1 shows a sensor head 100 of an optical linear encoder according to a first embodiment of the present invention.

The sensor head 100 is for detecting movement of a scale, which is mounted on a front side of the page space and is capable of linearly moving, and constitutes an optical linear encoder together with the scale.

The sensor head 100 has a first axis, i.e., an x axis parallel to the movement direction of the scale, a second axis, i.e., a y axis orthogonal to the x axis and parallel to a pattern surface of the scale, and a third axis, i.e., a z axis orthogonal to both the x axis and the y axis.

Figure 14:
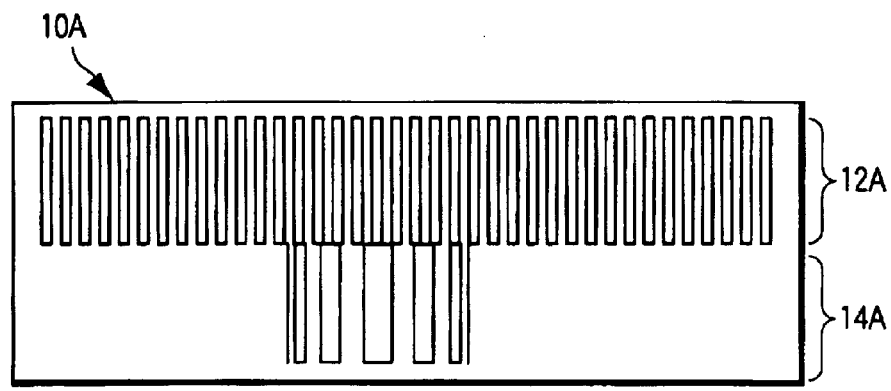
FIG. 14 shows a typical scale of the optical linear encoder, which includes a displacement detection optical pattern and a reference position detection optical pattern that are formed on respective tracks.

The scale is either a first scale 10A having a first optical pattern 12A and a second optical pattern 14A which can be divided by a straight line parallel to the x axis as shown in FIG. 14, or a second scale 10B having a first optical pattern 12B and a second optical pattern 14B which can be divided by a straight line parallel to the y axis.

Figure 15:
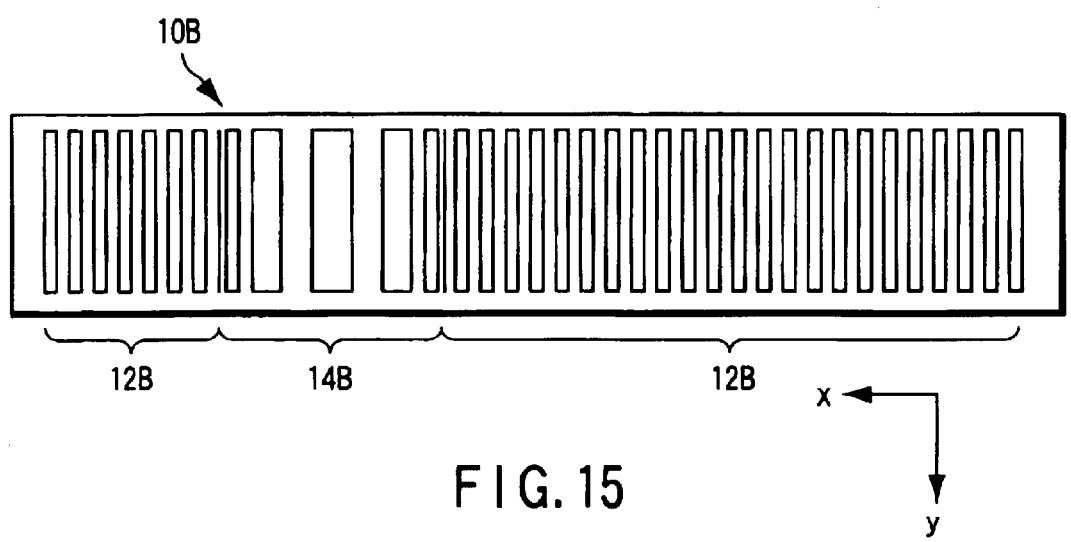
FIG. 15 shows another typical scale of the optical linear encoder, which includes a displacement detection optical pattern and a reference position detection optical pattern formed on a single track.

That is, the sensor head 100 constitutes the optical linear encoder in combination with either the first scale 10A shown in FIG. 14 or the second scale 10B depicted in FIG. 15. In other words, the sensor head 100 can constitute the optical linear encoder in combination with the first scale 10A shown in FIG. 14, and constitute the optical linear encoder in combination with the second scale 10B depicted in FIG. 15.

In the scale 10A of FIG. 14, the first optical pattern 12A is a displacement detection pattern, and the second optical pattern 14A is a reference position detection pattern. The displacement detection pattern 12A is a diffraction grating pattern whose reflectivity varies in a fixed period along the x axis. Such a diffraction grating pattern is formed by vapor-depositing and patterning a member with high reflectivity such as aluminum on the surface of a transparent member such as glass. The reference position detection pattern 14A is, e.g., a cylindrical holographic lens pattern that converges a light beam emitted thereon along the x axis and reflects it.

The displacement detection pattern 12A and the reference position detection pattern 14A respectively occupy a half of the area of the scale 10A along the y axis. The displacement detection pattern 12A extends over substantially the entire scale 10A along the x axis, and the reference position detection pattern 14A is formed at only a part of the scale 10A along the x axis.

Therefore, the displacement detection pattern 12A and the reference position detection pattern 14A are positioned side by side along the y axis. In other words, the displacement detection pattern 12A and the reference position detection pattern 14A are formed on different tracks. For this reason, the first scale 10A is referred to as a "two-track scale" in this specification.

Such a two-track scale 10A is suitable for an application of correctly detecting a displacement over the entire length of the scale.

In the scale 10B of FIG. 15, the first optical pattern 12B is a displacement detection pattern, and the second optical pattern 14B is a reference position detection pattern. The displacement detection pattern 12B is a diffraction grating pattern whose reflectivity varies in a fixed period along the x axis. Such a diffraction grating pattern is formed by vapor-depositing and patterning a member with high reflectivity such as aluminum on the surface of a transparent member such as glass. The reference position detection pattern 14B is, e.g., a cylindrical holographic lens pattern that converges a light beam emitted thereon along the x axis and reflects it.

Both the displacement detection pattern 12B and the reference position detection pattern 14B extend over substantially the entire scale 10B along the y axis. The reference position detection pattern 14B is formed at a part of the scale 10B along the x axis, and the displacement detection pattern 12B is formed on both sides of the reference position detection pattern 14B along the x axis. The displacement detection pattern 12B extends on substantially the entire both sides along the x axis.

Therefore, both the displacement detection pattern 12B and the reference position detection pattern 14B extend along the x axis. In other words, the displacement detection pattern 12B and the reference position detection pattern 14B are formed on the same track. For this reason, the second scale 10B is referred to as a "one-track scale" in this specification.

Such a one-track scale 10B is suitable for an application when the positional adjustment between the scale and the sensor head along the y axis is difficult or when the scale length must be set very long.

In the following description, when the scale 10A and the scale 10B do not have to be discriminated from each other, they are typically represented as the "scale 10". Further, when the displacement detection pattern 12A and the displacement detection pattern 12B do not have to be discriminated from each other, they are typically represented as the "displacement detection pattern 12". Likewise, when the reference position detection pattern 14A and the reference position detection pattern 14B do not have to be discriminated from each other, they are typically represented as the "reference position detection pattern 14".

The sensor head 100 is a sensor head of the optical linear encoder which is of a two-beam type, and includes a first light source, i.e., a displacement detection light source 122, which emits a first light beam, i.e., a coherent light beam applied to the scale 10 in order to detect a displacement of the scale 10, and a second light source, i.e., a reference position detection light source 142, which emits a second light beam applied to the scale 10 in order to detect a reference position of the scale 10. The first optical pattern of the scale 10, i.e., the displacement detection pattern 12, can be irradiated with the first light beam emitted from the displacement detection light source 122. Furthermore, the second optical pattern of the scale 10, i.e., the reference position detection pattern 14, can be irradiated with the second light beam emitted from the reference position detection light source 142.

The sensor head 100 further includes a first photo-detector, i.e., a displacement detection photo-detector 132 for detecting the light reflected by the first optical pattern, i.e., the displacement detection pattern 12, a pair of second photo-detectors, i.e., reference position detection photo-detectors 152 for detecting the light reflected by the second optical pattern, i.e., the reference position detection pattern 14, and a plate-like substrate 112 supporting these elements.

The displacement detection photo-detector 132 extends on both sides of the displacement detection light source 142 along both the x axis and the y axis. The pair of reference position detection photo-detectors 152 are positioned on both sides of the reference position detection light source 142 along the y axis. The displacement detection photo-detector 132 comprises opto-electric conversion elements aligned along the x axis. Each of the reference position detection photo-detectors 152 comprises an opto-electric conversion element. The opto-electric conversion element includes, for example, a photo-diode. For example, the substrate 112 is a semiconductor substrate, and the opto-electric conversion elements of the displacement detection photo-detector 132 and the opto-electric conversion element of the reference position detection photo-detector 152 are monolithically formed on the semiconductor substrate 112.

The displacement detection light source 122 and the reference position detection light source 124 are, e.g., illuminants that emit laser light beams, such as vertical cavity surface-emitting lasers. The displacement detection light source 122 and the reference position detection light source 142 are provided on the substrate plane on which the opto-electric conversion elements of the displacement detection photo-detector 132 and the opto-electric conversion elements of the reference position detection photo-detectors 152 are formed, and emit the light beam substantially vertically to the substrate plane.

A straight line connecting the center of the displacement detection photo-detector 132 and the middle point of the centers of the two reference position detection photo-detectors 152 crosses the x axis and the y axis. In other words, displacement detection light source 132 and the reference position detection photo-detectors 152 are arranged in this way. In this specification, the "center of the photo-detector" means the center of distribution of the opto-electric conversion elements when the photo-detector comprises opto-electric conversion elements, and means the center of the opto-electric conversion element itself when the photo-detector comprises a single opto-electric conversion element.

More preferably, the displacement detection photo-detector 132 and the reference position detection photo-detectors 152 are arranged in such a manner that a projection 132a and a projection 152a projected onto a yz plane orthogonal to the x axis are apart from each other, and a projection 132b and a projection 152b projected onto a zx plane orthogonal to the y axis are separated from each other.

Here, the principle of the operation of detecting a displacement of the scale in the general optical encoder will now be described with reference to a model of the transmission type encoder including the diffraction grating scale shown in FIG. 12. Here, although description will be given assuming the transmission type encoder for simplicity, the same discussion can be achieved in a reflection type encoder.

Figure 12:
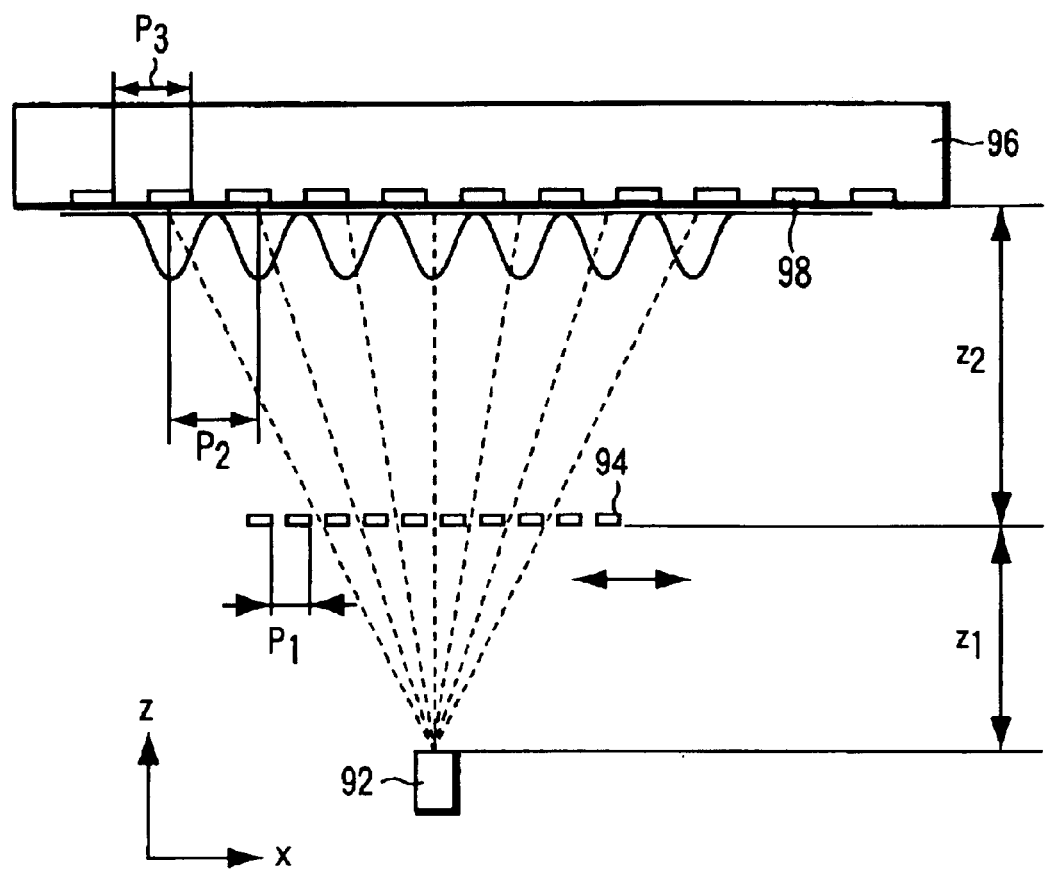
FIG. 12 shows a model of a transmission type encoder including a diffraction grating scale, for illustrating the principle of an operation of detecting a displacement of the scale in a general optical encoder.

In the model of the transmission type encoder shown in FIG. 12, it is assumed that $z_1$ is a gap between the light source 92 and a surface of the scale 94 on which the diffraction grating is formed, $z_2$ is a gap between the surface of the scale 94 on which the diffraction grating is formed and the photo-detector 96 for detection of a displacement, $p_1$ is a pitch of the diffraction grating on the scale, $p_2$ is a pitch of the diffraction interference pattern formed on the light receiving surface of the photo-detector 96, and $p_3$ is a pitch of light receiving areas 98 of the photo-detector 96. It is to be noted that the pitch directions of both the diffraction grating and the light receiving areas 98 are both parallel to the movement direction of the scale.

Here, the "pitch of the diffraction grating on the scale" means a spatial period of the pattern that the optical characteristic formed on the scale has been modulated. Moreover, the "pitch of the diffraction interference pattern" means a spatial period of the intensity distribution of the diffraction pattern formed on the light receiving surface of the photo-detector 96.

According to the diffraction theory of the light, if the above-described parameters satisfy the expression (1), the intensity pattern (so-called Talbot image) similar to the diffraction grating pattern of the scale 94 is formed on the light receiving surface of the photo-detector.

$$(1/z_1)+(1/z_2)=\lambda/kp_1^2 \qquad (1)$$

Here, $\lambda$ is a wavelength of the light emitted from the light source 92, and k is a natural number.

In this case, the pitch $p_2$ of the diffraction interference pattern on the light receiving surface can be represented as the following expression (2) by using other parameters.

$$p_2=p_1(z_1+z_2)/z_1 \qquad (2)$$

When the scale 94 displaces with respect to the light source 92 in the pitch direction of the diffraction grating, the intensity distribution of the diffraction interference pattern moves in the direction of displacement of the scale with the same spatial period being maintained.

In addition, the pitch $p_3$ of the light receiving areas 98 of the photo-detector 96 is designed so as to be equal to the pitch $p_2$ of the diffraction interference pattern generated on the light receiving surface of the photo-detector 96. In other words, values of various kinds of parameters are determined on the design stage in this manner.

As a result of the fact that the pitch $p_3$ of the light receiving area 98 of the photo-detector 96 is equal to the pitch $p_2$ of the diffraction interference pattern generated on the light receiving surface of the photo-detector 96, a signal that periodically varies is output from the photo-detector 96, and its one cycle corresponds to movement of the scale 94 by one pitch (namely, movement by a distance equal to $p_1$). Therefore, a displacement of the scale is obtained based on the signal output from the photo-detector 96.

Description will now be given as to the operation of detecting a displacement of the scale in the optical encoder using the sensor head 100 according to the present invention.

Figure 2:
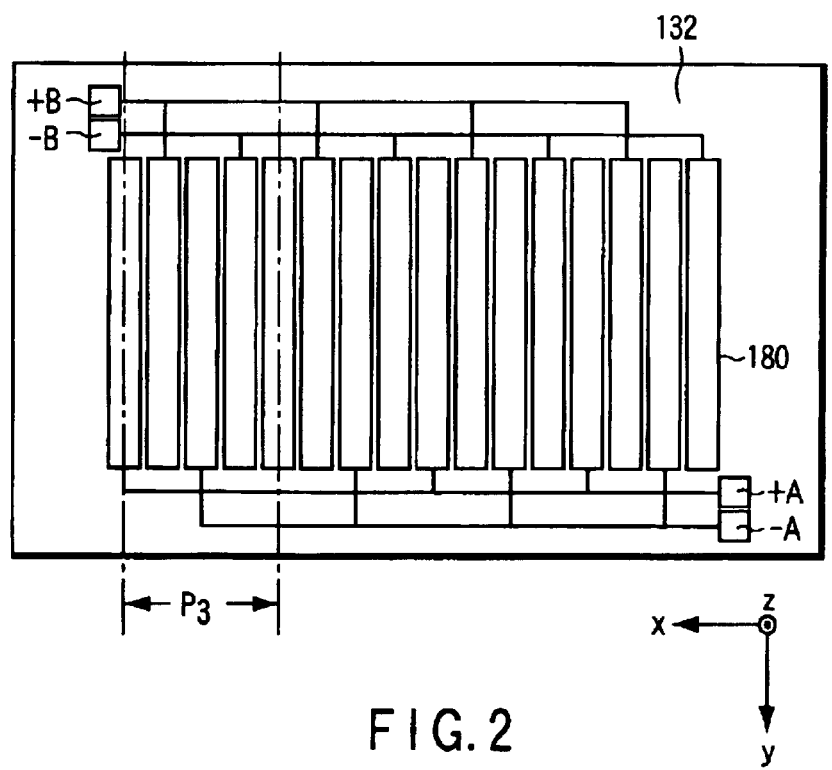
FIG. 2 shows light receiving areas of a displacement detection photo-detector of the sensor head depicted in FIG. 1.

As described above, the displacement detection photo-detector 132 has the opto-electric conversion elements aligned along the x axis, and therefore it has light receiving areas 180 aligned along the x axis as shown in FIG. 2. The light receiving areas 180 are divided into four groups, which detect the same phase of the wave having a pitch $p_3$, namely, a first, i.e., +A group, a second, i.e., +B group, a third, i.e., −A group and a fourth, i.e., −B group, and the light receiving areas 180 in the same group are electrically is connected with each other. That is, the light receiving areas 180 belonging to the same group are aligned with the pitch of $p_3$ along the x axis, and the two adjacent light receiving areas 80 are aligned with the pitch of $p_3/4$ along the x axis.

The displacement detection light source 122, the displacement detection pattern 12 and the displacement detection photo-detector 132 are set in such a manner that a Talbot image is projected onto the displacement detection photo-detector 132. That is, the pitch $p_1$ of the displacement detection pattern of the scale, a lasing wavelength λ of the vertical cavity surface-emitting laser of the displacement detection light source 122, a vertical distance $z_1$ from the emission end of the vertical cavity surface-emitting laser to the displacement detection pattern surface of the scale, and a vertical distance $z_2$ from the displacement detection pattern surface of the scale to the displacement detection photo-detector are set so as to satisfy the above expression (1). In addition, the pitch $p_3$ of the light receiving areas 180 is set equal to the pitch $p_2$ of the diffraction interference pattern represented by the above expression (2).

As a result, a so-called Talbot image is formed on the light receiving areas 180 of the displacement detection photo-detector 132. This Talbot image moves on the light receiving areas 180 of the displacement detection photo-detector 132 along the x axis in accordance with movement of the scale.

The light receiving areas 180 in the +A group and the light receiving areas 180 in the −A group output signals whose phases are shifted 180 degrees from each other, and these signals are subjected to subtraction by a non-illustrated signal processing circuit, thereby producing an A phase signal. Likewise, the light receiving areas 180 in the +B group and the light receiving areas 180 in the −B group output signals whose phases are shifted 180 degrees from each other, and these signals are subjected to subtraction by the non-illustrated signal processing circuit, thereby generating a B phase signal.

The A phase signal and the B phase signal are stable signals with the influence of external light and the like canceled therefrom, and they have quasi-sinusoidal waveforms whose phases are shifted 90 degrees from each other. A movement direction and a displacement of the scale are obtained based on the A phase signal and the B phase signal.

As described above, the reference position detection light receiving portion 152 has the opto-electric conversion element, and it therefore has a single light receiving area. The reference position detection photo-detector 152 outputs a signal according to the intensity of the light incident thereupon. When the scale is placed at the reference position, the reference position detection pattern reflects the light beam from the reference position detection light source 142, and condenses the reflected light in the light receiving area of the reference position detection photo-detector 152.

Figure 13:
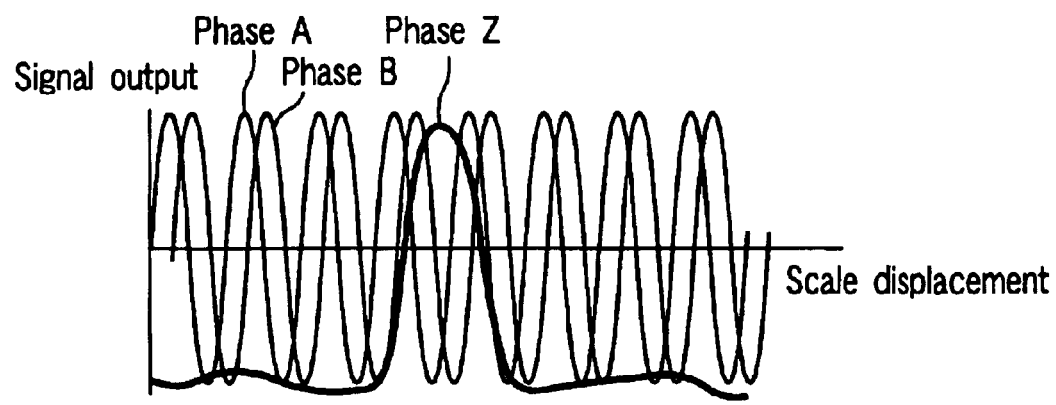
FIG. 13 shows an A phase signal and a B phase signal obtained based on an output from a displacement detection photo-detector and a Z phase signal obtained based on an output from a reference position photo-detector in the sensor head depicted in FIG. 1.

An output signal from the reference position detection photo-detector 152 is a so-called Z phase signal, and the Z phase signal has a peak at one specific position relative to displacement of the scale as shown in FIG. 13. Therefore, whether the scale is placed at a specific position, i.e., the reference position can be judged from the Z phase signal, or whether the scale has reached the reference position can be detected.

Figure 3:
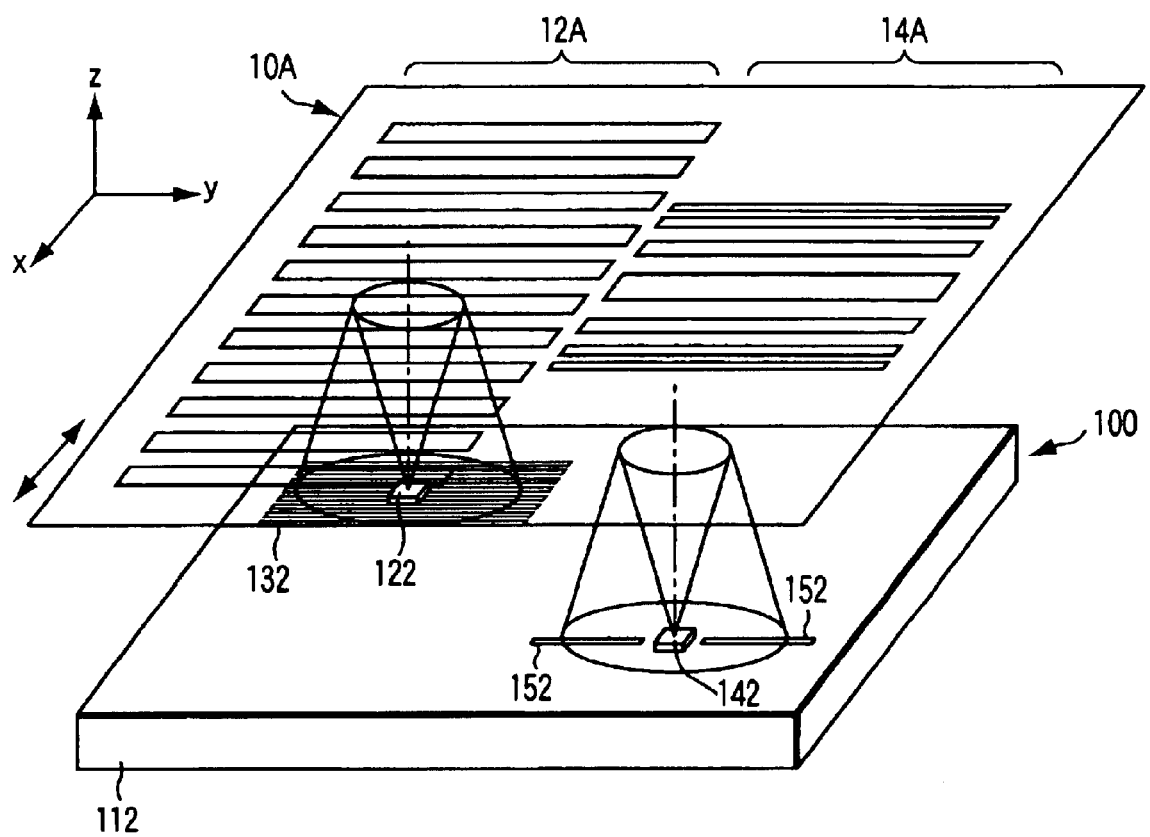
FIG. 3 is a perspective view showing of an optical linear encoder constituted by a combination of the sensor head depicted in FIG. 1 and a scale illustrated in FIG. 14.
Figure 4:
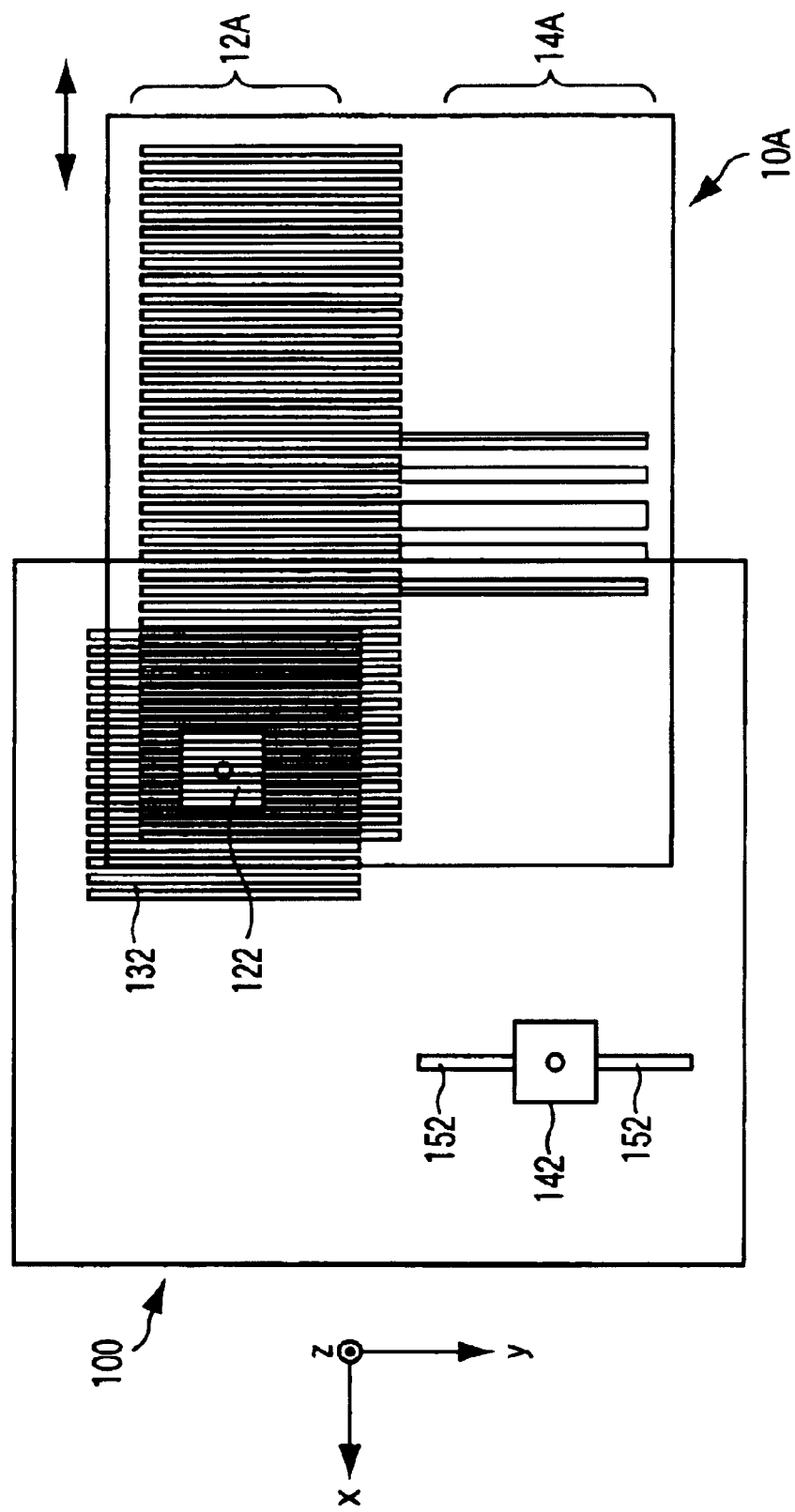
FIG. 4 is a projection drawing of the sensor head and the scale of the optical linear encoder depicted in FIG. 3 onto an xy plane.

FIGS. 3 and 4 show an optical linear encoder constituted by a combination of the sensor head 100 depicted in FIG. 1 and the scale 10A illustrated in FIG. 14.

As described above, the scale 10A is a two-track scale, and the displacement detection pattern 12A and the reference position detection pattern 14A can be, divided by a straight line parallel to the x axis as shown in FIG. 14. That is, the displacement detection pattern 12A and the reference position detection pattern 14A are respectively formed on different tracks. Such a two-track scale 10A is preferably used for an application where a displacement is to be accurately detected over the entire length of the scale.

In FIG. 4, the scale 10A and the sensor head 100 are subjected to positional adjustment in such a manner that the light emitted from the displacement detection light source 122 and reflected by the reference position detection pattern 14A does not enter the displacement detection photo-detector 132 and the light emitted from the reference position detection light source 142 and the reflected by the displacement detection pattern 12A does not enter the reference position detection photo-detector 152. Specifically, the relative position of the scale 10A and the sensor head 100B along the y axis is adjusted. In particular, when the scale 10A is long, the inclination of the sensor head 100B about the z axis relative to the scale 10A is also adjusted.

As described above, in the optical linear encoder obtained by combining the sensor head 100 with the two-track scale 10A, since the light beam condensed by the reference position detector pattern 14A does not enter the displacement detection photo-detector 132, a displacement can be detected over the entire length of the scale without being affected by positions or the number of the reference position detection patterns 14A.

Figure 5:
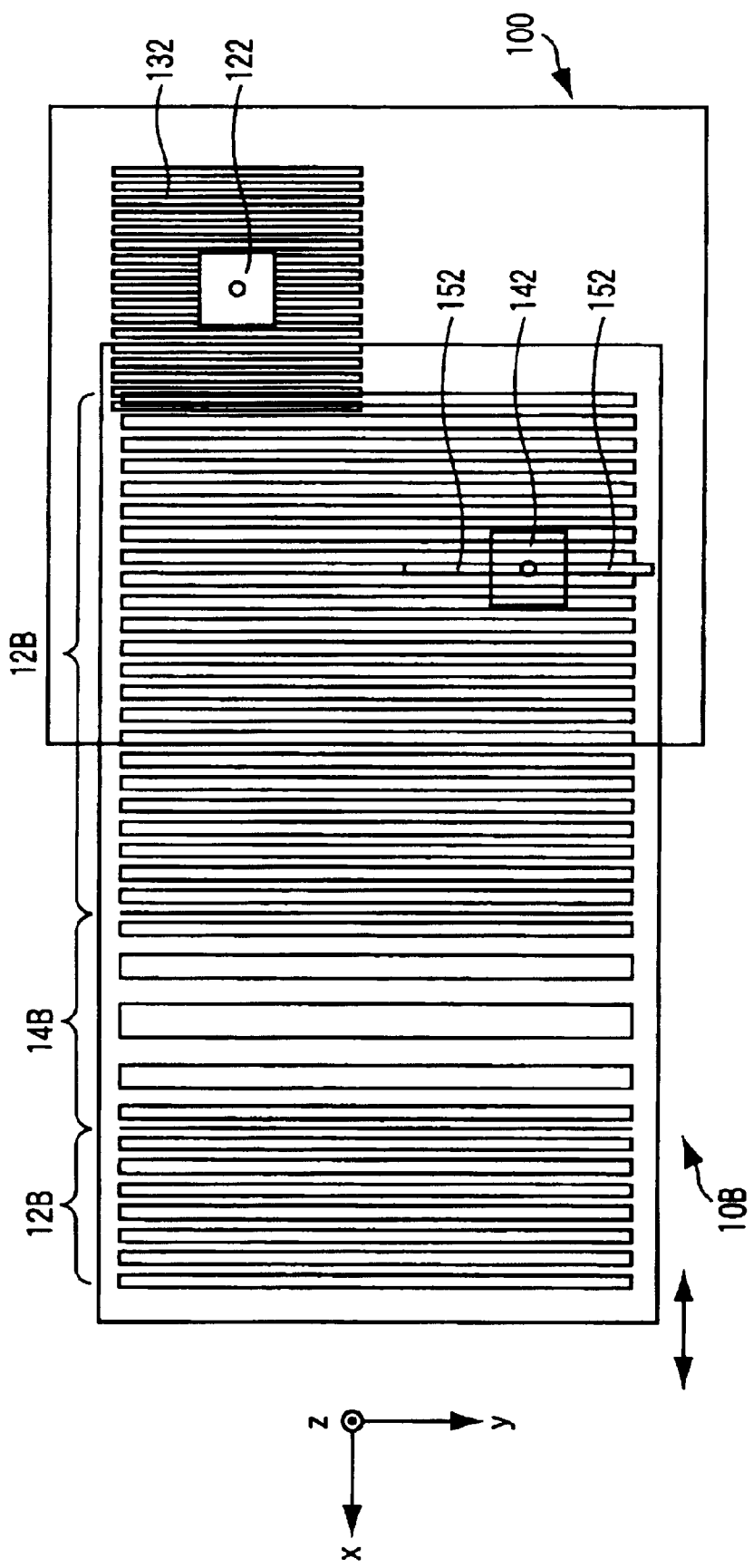
FIG. 5 is a projection drawing of the optical linear encoder constituted by a combination of the sensor head depicted in FIG. 1 and a scale illustrated in FIG. 15 onto the xy plane.

FIG. 5 shows an optical linear encoder constituted by a combination of the sensor head 100 depicted in FIG. 1 and the scale 10B illustrated in FIG. 15.

As described above, the scale 10B is an one-track scale, and the displacement detection pattern 12B and the reference position detection pattern 14B can be divided by a straight line parallel to the y axis as shown in FIG. 15. That is, the displacement detection pattern 12B and the reference position detection pattern 14B are formed on the same track.

In FIG. 5, it is sufficient that the positions of the scale 10B and the sensor head 100 along the y axis are adjusted in such a manner that the light emitted from the displacement detection light source 122 and reflected by the displacement detection pattern 12B enters the displacement detection photo-detector 132, and the light beam emitted from the reference position detection light source 142 and reflected by the reference position detection pattern 14B enters the reference position detection photo-detector 152. That is, in this optical linear encoder, an allowable range concerning the relative position of the sensor head 100 and the scale 100B along the y axis is large.

In the optical linear encoder obtained by combining the sensor head 100 depicted in FIG. 1 with the one-track scale 10B illustrated in FIG. 15, a displacement of the scale 10B can be detected except for a range that the light beam emitted from the displacement detection light source 122 and condensed by the reference position detection pattern 14B enters the displacement detection photo-detector 132.

Specifically, in the state shown in FIG. 5, when the scale 10B moves from the left to the right with respect to the sensor head 100 (that is, the scale 10B moves in a direction of −x), a Talbot image formed by the displacement detection pattern 12B is first projected onto the displacement detection photo-detector 132, and a displacement of the scale 10B can be detected by the displacement detection photo-detector 132. At that time, although the Talbot image is also projected onto the reference position detection photo-detector 152, this cannot be a factor leading to an erroneous judgment for detecting the reference position of the scale because the intensity of the incident light is sufficiently smaller than the intensity of the light beam condensed by the reference position detection pattern 14B.

Additionally, when the scale 10B moves in the direction of −X, the light beam condensed by the reference position detection pattern 14B enters the reference position detection photo-detector 152, and the reference position of the scale 10B can be detected. The Talbot image continues to be projected on the displacement detection photo-detector 132 at this point in time, and a displacement of the scale 10B can be detected.

When the scale 10B further moves toward the right side, the light beam condensed by the reference position detection pattern 14B begins to enter the displacement detection photo-detector 132. Since the intensity of this light beam is greater than the light intensity of the Talbot image, a displacement of the scale 10B cannot be detected in this region. However, when the scale 10B further moves toward the right side and the light beam from the reference position detection pattern 14B passes through the displacement detection photo-detector 132, a displacement of the scale 10B can be again detected because the Talbot image obtained by the displacement detection pattern 12B provided on the left side of the reference position detection pattern 14B on the scale 10B is again projected onto the displacement detection photo-detector 132.

Although FIG. 5 shows the case that the present invention is applied for a use where the reference position detection pattern 14B moves from the right side (in other words, it moves in the direction of −x), it is sufficient that both the scale 10 and the sensor head 100 are rotated 180 degrees and arranged when the present invention is applied for a use where the reference position detection pattern 14B moves from the left side (in other words, it moves in a direction of +x).

The optical linear encoder using the sensor head 100 is of a two-beam type, and a spot formed on the scale by the light beam emitted from the displacement detection light source 122 is apart from a spot formed on the scale by the light beam emitted from the reference position detection light source 142. Further, a spot formed on the substrate by the light beam emitted from the displacement detection light source 122 and reflected on the scale is apart from a spot formed on the substrate by the light beam emitted from the reference position detection light source and reflected on the scale.

In such an optical linear encoder that is of the two-beam type, an output from the displacement detection light source 122 and an output from the reference position detection light source 142 can be set in accordance with the corresponding sensitivities of the displacement detection photo-detector 132 and the reference position detection photo-detector 152.

As apparent from the above description, the sensor head 100 according to this embodiment can be applied to both the two-track scale 10A having the displacement detection pattern 12A and the reference position detection pattern 14A formed on the two tracks as shown in FIG. 14 and the one-track scale 10B having the displacement detection pattern 12B and the reference position detection pattern 14B formed on one track as shown in FIG. 15.

Therefore, the sensor head 100 can be used without being dependent on the specification of the scale determined in accordance with a use application. This gives to a provider of the optical encoder an advantage that preparing one type of sensor head can suffice. This is profitable for a decrease in the production cost of the optical encoder. Furthermore, this gives to a user of the optical encoder advantages that the same sensor head can be always used without considering types of the scale or that the type of scale can be changed without replacing the sensor head, and others. This is profitable for improvement in the assembling property or the diversity.

Second Embodiment

Figure 6:
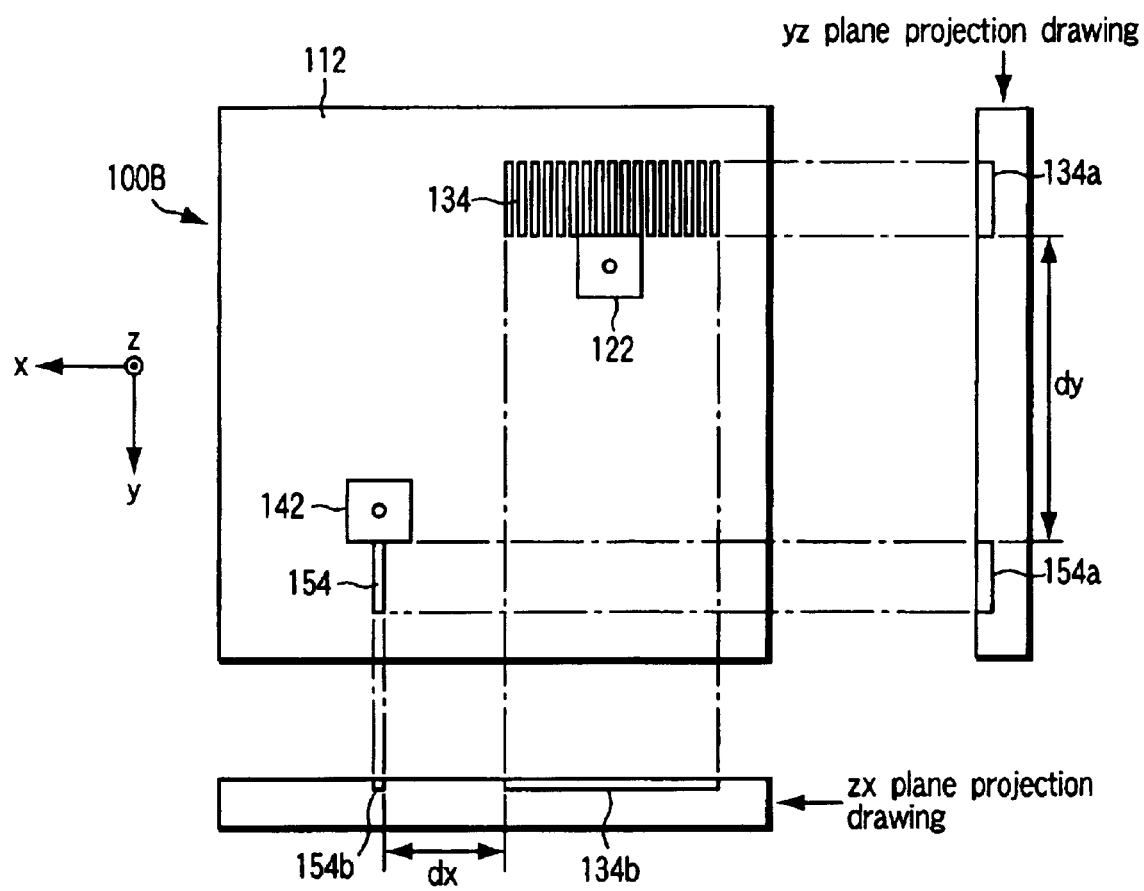
FIG. 6 shows a sensor head of an optical linear encoder according to a second embodiment of the present invention.

FIG. 6 shows a sensor head 100B of an optical linear encoder according to a second embodiment of the present invention. The sensor head 100B according to this embodiment resembles the sensor head 100 (FIG. 1) according to the first embodiment. In FIG. 6, like reference numerals denote members equal to those in FIG. 1, and their detailed explanation is eliminated in order to avoid repeated description in the following.

The sensor head 100B is a sensor head of a two-beam type optical linear encoder and, as shown in FIG. 6, it includes a displacement detection light source 122, a reference position detection light source 142, a first photo-detector, i.e., a displacement detection photo-detector 134 for detecting the light reflected by the displacement detection pattern 12, a second photo-detector, i.e., a reference position detection photo-detector 154 for detecting the light reflected by the reference position detection pattern 14, and a plate-like substrate 112 supporting these elements.

The displacement detection photo-detector 134 is positioned on the outer side (upper side in the drawing) of the displacement detection light source 122 along the y axis. The reference position detection photo-detector 154 is positioned on the outer side (lower side in the drawing) of the reference position detection light source 142 along the y axis. The displacement detection photo-detector 134 comprises opto-electric conversion elements aligned along the x axis. The reference position detection photo-detector 154 comprises an opto-electric conversion element. For example, the substrate 112 is a semiconductor substrate, and the opto-electric conversion elements of the displacement detection photo-detector 134 and the opto-electric conversion element of the reference position detection photo-detector 154 are monolithically formed on the semiconductor substrate 112.

A straight line connecting the center of the displacement detection photo-detector 134 with the center of the reference position detection photo-detector 154 crosses both the x axis and the y axis. In other words, the displacement detection photo-detector and the reference position detection photo-detector are arranged in such a manner that the straight line connecting the centers of these members crosses both the x axis and the y axis.

More preferably, the displacement detection photo-detector 134 and the reference position detection photo-detector 154 are arranged in such a manner that a projection 134a of the displacement detection photo-detector projected onto a yz plane orthogonal to the x axis is apart from a projection 154a of the reference position detection photo-detector projected onto the same and that a projection 134b of the displacement detection photo-detector projected onto a zx plane orthogonal to the y axis is apart from a projection 154b of the reference position Detection photo-detector projected onto the same.

Figure 7:
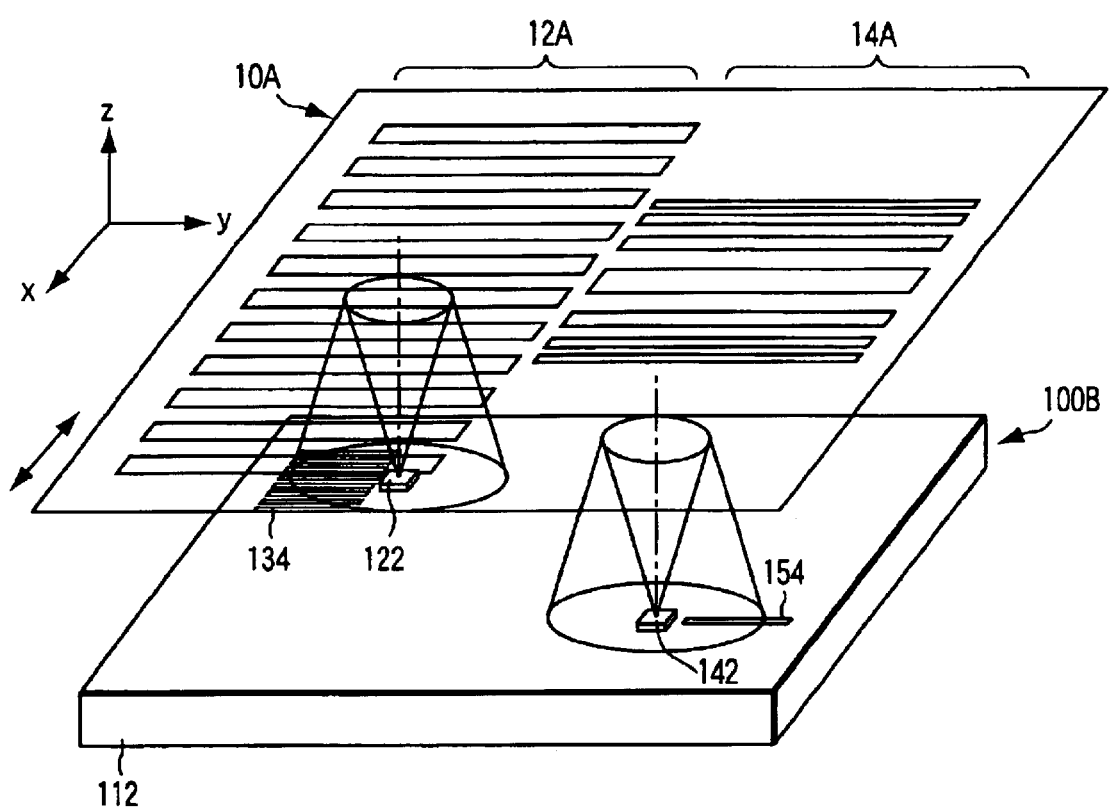
FIG. 7 is a perspective view showing the optical linear encoder constituted by a combination of the sensor head depicted in FIG. 6 and the scale illustrated in FIG. 14.
Figure 8:
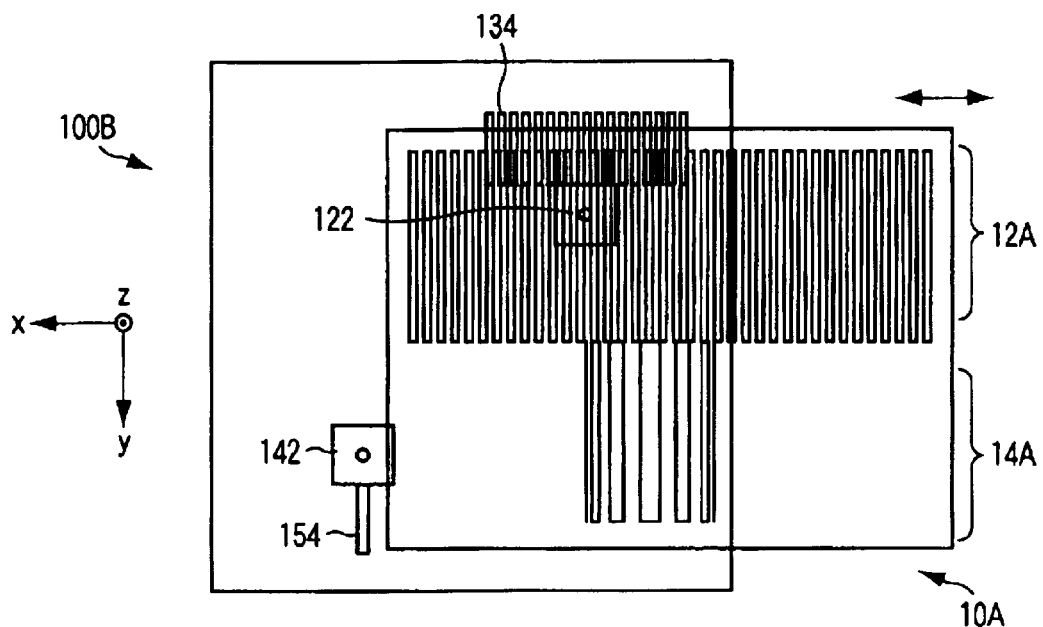
FIG. 8 is a projection drawing of the sensor head and the scale of the optical linear encoder depicted in FIG. 7 onto the xy plane.

FIGS. 7 and 8 show an optical linear encoder constituted by a combination of the sensor head 100B shown in FIG. 6 and the scale 10A depicted in FIG. 14.

In FIG. 8, the scale 10A and the sensor head 100B are subjected to positional adjustment in such a manner that the light emitted from the displacement detection light source 122 and reflected by the reference position detection pattern 14A does not enter the displacement detection photo-detector 134 and the light emitted from the reference position detection light source 142 and reflected by the displacement detection pattern 12A does not enter the reference position detection photo-detector 154. Specifically, the relative position of the scale 10A and the sensor head 100B along the y axis is adjusted. In particular, when the scale 10A is long, an inclination of the sensor head 100B about the z axis relative to the scale 10A is also adjusted.

An allowable range of adjustment is wider as a distance dy between the projection 134a of the displacement detection photo-detector 134 and the projection 154a of the reference position detection photo-detector 154 is larger in the yz plane projection diagram shown in FIG. 6. In the sensor head 100B according to this embodiment, since the displacement detection photo-detector 134 and the reference position detection photo-detector 154 are not placed between the displacement detection light source 122 and the reference position detection light source 142 along the y axis and the distance dy is large, the allowable range of positional adjustment of the scale 10A and the sensor head 100B is relatively large.

As described above, in the optical linear encoder obtained by a combination of the sensor head 100B and the two-track scale 10A, the exact positional adjustment is required with respect to the scale 10A and the sensor head 100B as compared with a later-described optical linear encoder obtained by a combination of the sensor head 100B and the one-track scale 10B, but a displacement can be detected over the entire length of the scale because the light beam condensed by the reference position detection pattern 14A does not enter the displacement detection photo-detector 132.

Figure 9:
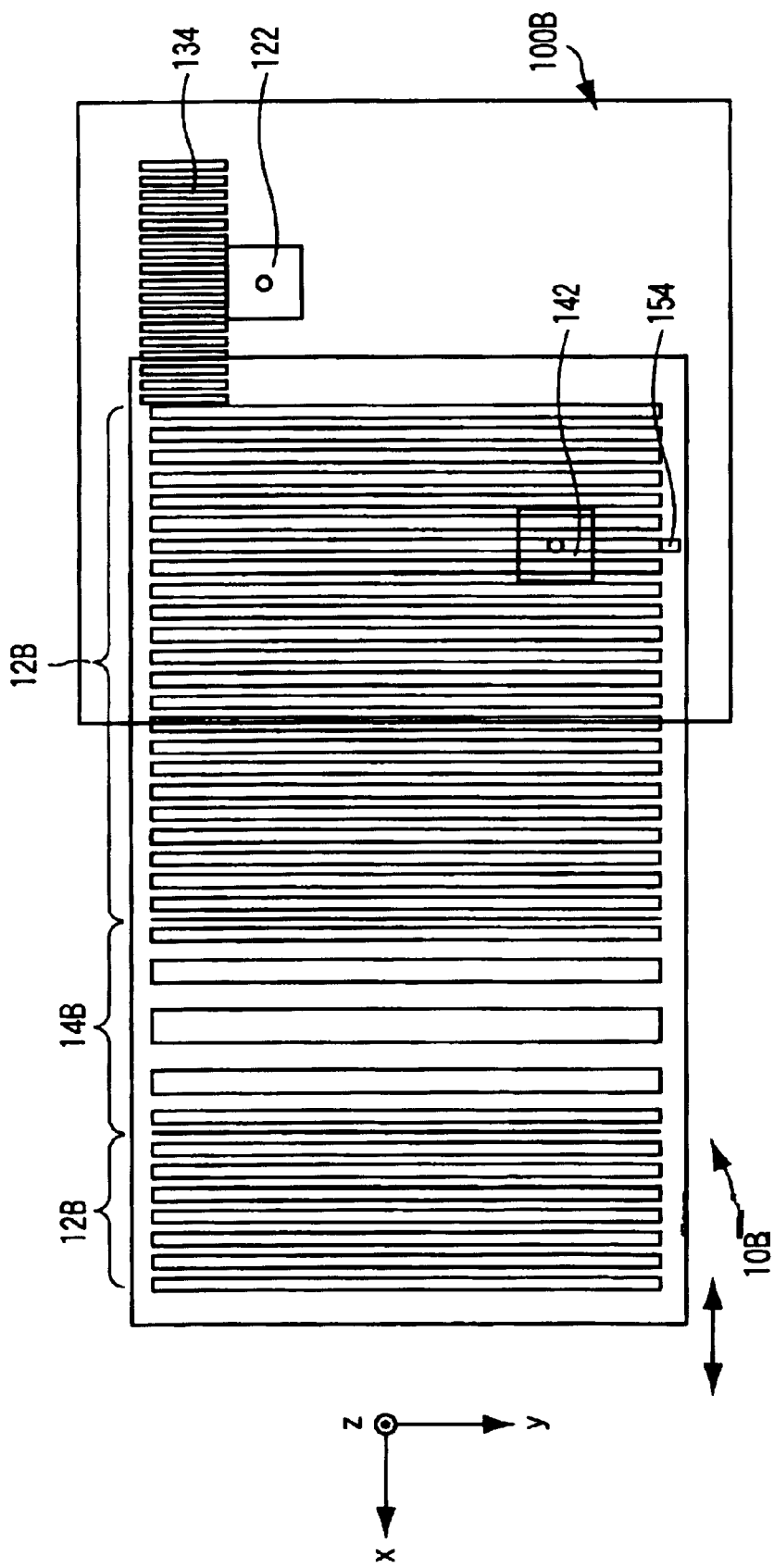
FIG. 9 is a projection drawing of the optical linear encoder constituted by a combination of the sensor head depicted in FIG. 6 and the scale illustrated in FIG. 15 onto the xy plane.

FIG. 9 shows an optical linear encoder constituted by a combination of the sensor head 100B depicted in FIG. 6 and the one-track scale 10B illustrated in FIG. 15.

In FIG. 9, it is sufficient to adjust positions of the scale 10B and the sensor head 100B along the y axis in such a manner that the light emitted from the displacement detection light source 122 and reflected by the displacement detection pattern 12B can enter the displacement detection photo-detector 134 and the light beam emitted from the reference position detection light source 142 and reflected by the reference position detection pattern 14B can enter the reference position detection photo-detector 154. That is, in this optical linear encoder, the allowable range of positional adjustment of the sensor head 100B and the scale 10B is large.

As described above, in the optical linear encoder obtained by combining the sensor head 100B with the one-track scale 10B, even though a displacement of the scale 10B cannot be detected as long as the light beam emitted from the displacement detection light source 122 and condensed by the reference position detection pattern 14B enters the displacement detection photo-detector 134, the allowable range of positional adjustment between the sensor head 100B and the scale 10B required in assembling is large.

Like the sensor head 100A according to the first embodiment, the sensor head 100B according to the present embodiment can be applied to both the two-track scale 10A shown in FIG. 14 and the one-track scale 10B shown in FIG. 15.

Further, the sensor head 100B according to this embodiment has an advantage that the allowable range of positional adjustment required between the sensor head 100B and the scale 10A is definitely larger than that of the first embodiment in the combination with the two-track scale 10A shown in FIG. 14 as well as the advantage like that of the sensor head 100A according to the first embodiment.

Third Embodiment

Figure 10:
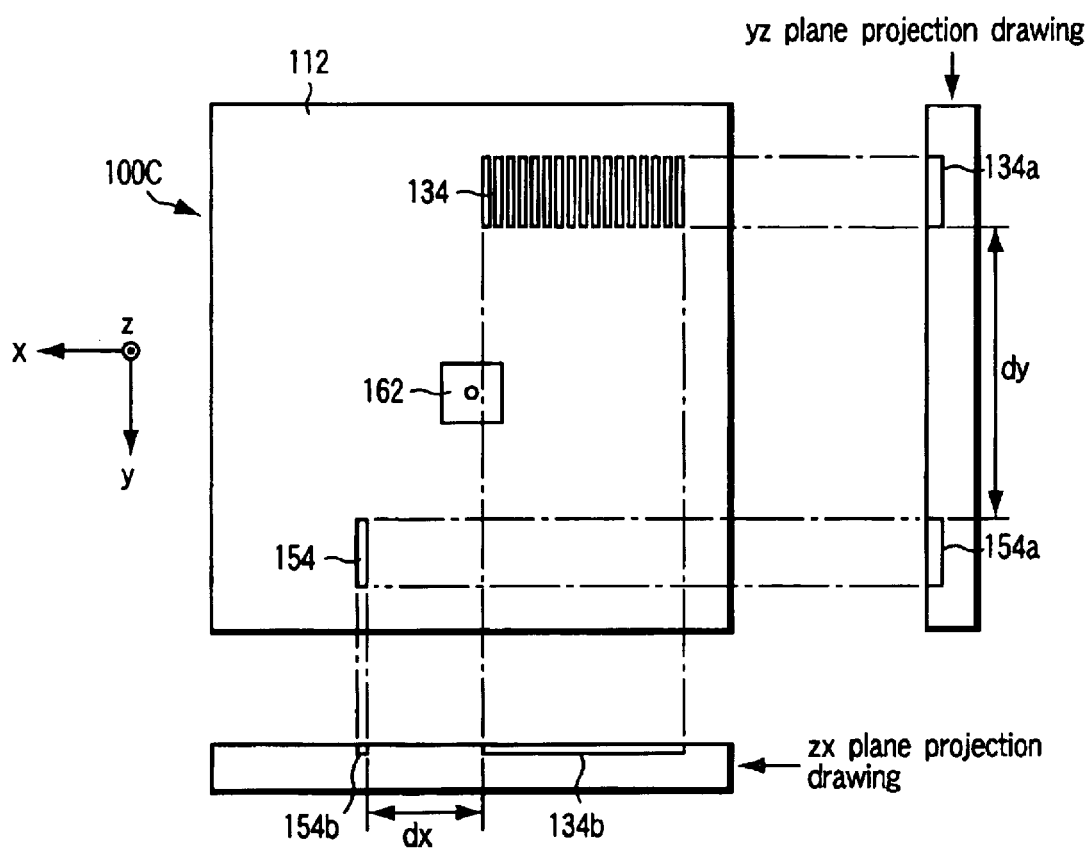
FIG. 10 shows a sensor head of an optical linear encoder according to a third embodiment of the present invention.

FIG. 10 shows a sensor head 100C of an optical linear encoder according to a third embodiment. The sensor head 100C according to this embodiment resembles the sensor head 100B (FIG. 6) according to the second embodiment. In FIG. 10, like reference numerals denote members equal to those in FIG. 6, and their detailed explanation is eliminated in order to avoid repeated description.

The sensor head 100C according to this embodiment has a structure that the displacement detection light source 122 and the reference position detection light source 142 in the sensor head 100B according to the second embodiment are substituted by one light source.

That is, the sensor head 100C is a sensor head of the one-beam type optical linear encoder, and includes a light source 162, which emits one coherent light beam for detection of a displacement and a reference position of the scale 10, as shown in FIG. 10. Both the displacement detection pattern 12 and the reference position detection pattern 14 can be irradiated with the coherent light beam emitted from the light source 162.

The sensor head 100C further includes a displacement detection photo-detector 134 for detecting the light reflected by the displacement detection pattern 12, a reference position detection photo-detector 154 for detecting the light reflected by the reference position detection pattern 14, and a plate-like substrate 112 supporting these elements.

The displacement detection photo-detector 134 and the reference position detection photo-detector 154 are positioned so as to deviate along both the x axis and the y axis, and the light source 162 is placed at substantially the central position of these elements. The light source 162 is, e.g., a vertical cavity surface-emitting laser and emits the light beam substantially vertically to the plane of the substrate 112.

The sensor head 100C constitutes the optical linear encoder in combination with the two-track scale 10A shown in FIG. 14 or the one-track scale 10B shown in FIG. 15. In this optical linear encoder, detection of a displacement and detection of a reference position of the scale 10 are carried out as in the second embodiment.

The sensor head 100C according to this embodiment is a sensor head of the one-beam type optical linear encoder and one light source can suffice, thus inexpensively being constituted as compared with the sensor head 100B according to the second embodiment.

In order to increase the distance dy between the displacement detection photo-detector 134 and the reference position detection photo-detector 154 along the x axis and the distance dy between the same along the y axis and not to increase the intensity of the light beam emitted from the vertical cavity surface-emitting laser more than needs, the light source 162 may comprise a vertical cavity surface-emitting laser that emits the beam with a large extending angle.

Fourth Embodiment

Figure 11:
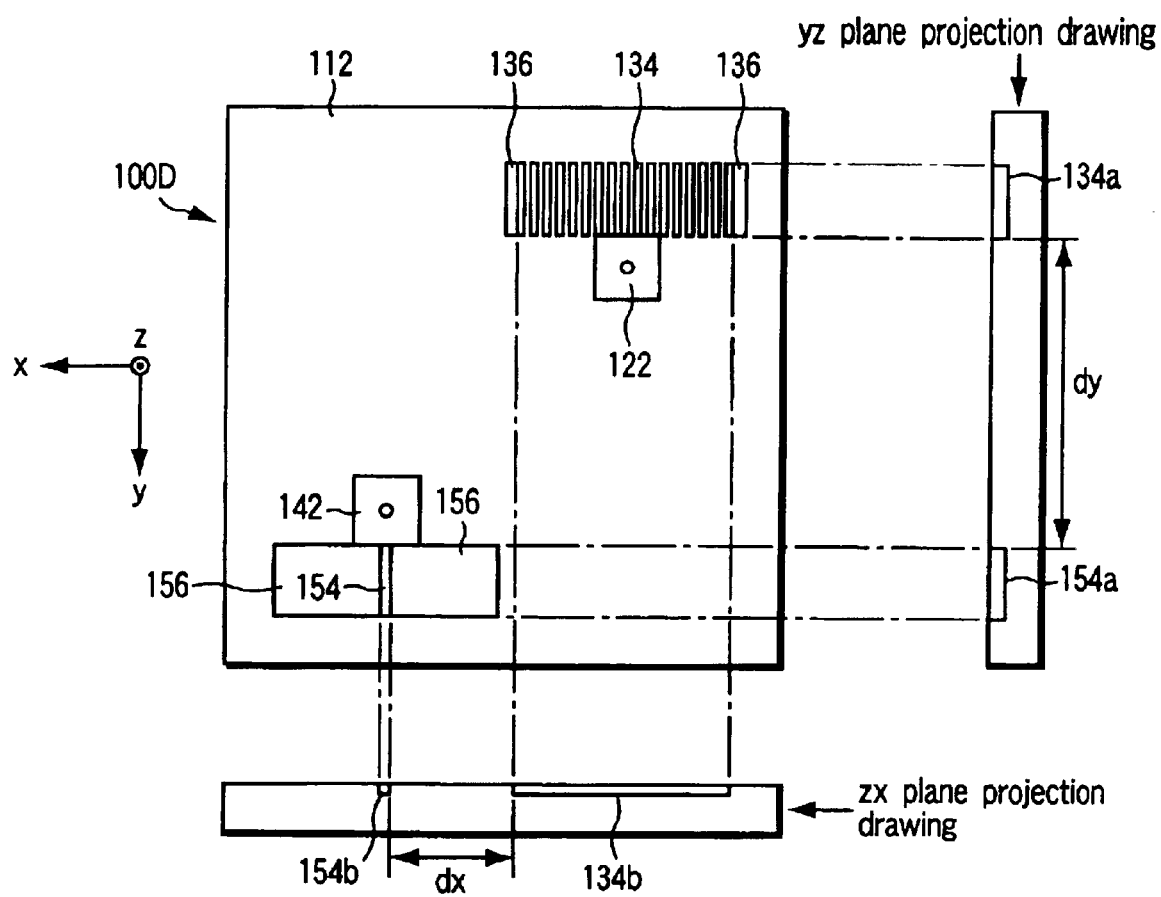
FIG. 11 shows a sensor head of an optical linear encoder according to a fourth embodiment of the present invention.

FIG. 11 shows a sensor head 100D of an optical linear encoder according to a fourth embodiment of the present invention. The sensor read 100D according to this embodiment is similar to the sensor head 100B (FIG. 6) according to the second embodiment. In FIG. 11, like reference numerals denote members equal to those in FIG. 6, and their detailed explanation is eliminated in the following in order to avoid repeated description.

The sensor head 100D according to this embodiment has a structure that a pair of dummy photo-detectors are added on both sides of each of the displacement detection photo-detector 134 and the reference position detection photo-detector 154 along the x axis in the sensor head 100B according to the second embodiment.

That is, the sensor head 100D is a sensor head of the two-beam type optical linear encoder and, as shown in FIG. 11, it includes a displacement detection light source 122, a reference position detection light source 142, a displacement detection photo-detector 134, a reference position detection photo-detector 154, a pair of first dummy photo-detectors 136 located on both sides of the displacement detection photo-detector 134 along the x axis, a pair of second dummy photo-detectors 156 located on both sides of the reference position detection photo-detector 154 along the x axis, and a plate-like substrate 112 supporting these elements.

The sensor head 100D constitutes the optical linear encoder in combination with the two-track scale 10A shown in FIG. 14 or the one-track scale 10B shown in FIG. 15. In this optical linear encoder, detection of a displacement of the scale 10 and detection of a reference position are carried out like the second embodiment.

Each of the pair of first dummy photo-detectors 136 comprises an opto-electric conversion element, and each of the pair of second dummy photo-detectors 156 comprises an opto-electric conversion element. Outputs from these opto-electric conversion elements are not utilized for detection of a displacement or detection of a reference position of the scale 10. In other words, the dummy photo-detector is an opto-electric conversion element whose output is not used for detection of a displacement or detection of a reference position of the scale 10.

The opto-electric conversion element of the first dummy photo-detector 136 and the opto-electric conversion element of the second dummy photo-detector 156 are monolithically formed on the semiconductor substrate 112 together with the opto-electric conversion element constituting the displacement detection photo-detector 134 or the opto-electric conversion element constituting the reference position detection photo-detector 154.

The first dummy photo-detectors 136 and the second dummy photo-detectors 156 are provided in order to avoid the influence of crosstalk. Crosstalk is a phenomenon where the light that has deviated from a target opto-electric conversion element (or a light receiving area) and entered the vicinity thereof is detected at that opto-electric conversion element despite of the fact that the light is not supposed to be detected at that opto-electric conversion element.

The displacement detection photo-detector 134 comprises opto-electric conversion elements (in other words, includes light receiving areas), and the phenomenon of crosstalk occurs in these opto-electric conversion elements (or the light receiving areas), but the influences of crosstalk are canceled out and can be ignored except for the two opto-electric conversion elements at both ends.

In the structure having no first dummy photo-detector 136 provided, outputs of the opto-electric conversion elements at both ends of the displacement detection photo-detector 134 are affected by crosstalk caused by the light that has entered the outside of both ends of the displacement detection photo-detector 134 along the x axis and become larger than outputs corresponding to the intensity of the light (or quantity of light) that has actually entered therein. Therefore, an offset is added to the outputs from the opto-electric conversion elements (or the light receiving areas) at both ends of the displacement detection photo-detector 134, which can be a factor of the error in detection of a displacement of the scale.

In the sensor head 100D according to this embodiment, since the first dummy photo-detectors 136 are located on the outer sides of both ends of the displacement detection photo-detector 134 along the x axis, outputs from the opto-electric conversion elements at both ends of the displacement detection photo-detector 134 become adequate like outputs from any other opto-electric conversion elements of the displacement detection photo-detector 134.

In other words, in view of the displacement detection photo-detector 134 and the first dummy photo-detectors 136 as a whole, only the opto-electric conversion elements of the first dummy photo-detectors 136 are affected by crosstalk, and outputs from all the opto-electric conversion elements of the displacement detection photo-detector 134 can ignore the influence of crosstalk and become equal under the same condition.

That is, the first dummy photo-detector 136 avoids the influence of crosstalk with respect to the displacement detection photo-detector 134. Therefore, the optical linear encoder using the sensor head 100D can stably and accurately detect a displacement of the scale.

Furthermore, the similar influence can be considered with respect to the reference position detection photo-detector 154. That is, in the structure having no second dummy photo-detector 156 provided, outputs from the reference position detection photo-detector 154 are affected by crosstalk caused by the light that has entered the outer side of both ends of the reference position detection photo-detector 154 along the x axis and become larger than outputs corresponding to the intensity of the light (or quantity of light) that has actually entered therein. In other words, this is equal to a substantial increase in the dimension of the reference position detection photo-detector 154 along the x axis than the design value. As a result, an output signal of the reference position becomes fuzzy, which can be a factor of the error in detection of the reference position of the scale.

In the sensor head 100D according to this embodiment, since the second dummy photo-detectors 156 are located on the outer side of both ends of the reference position detection photo-detector 154 along the x axis, the light that has entered the second dummy photo-detector 156 cannot be detected in the reference position detection photo-detector 154 except for the crosstalk component of the light that has entered the boundary part between the second dummy photo-detectors 156 and the reference position detection photo-detector 154. Since the crosstalk component corresponds to the intensity of the light and is thus stable, the width of the reference position detection photo-detector 154 (dimension along the x axis) can be ideally designed.

That is, the second dummy photo-detectors 156 avoid the influence of crosstalk with respect to the reference position detection photo-detector 154. Therefore, the optical linear encoder using the sensor head 100D can stably and accurately detect a displacement of the scale.

In general, light output from the vertical cavity surface-emitting laser constituting the displacement detection light source 122 or the reference position detection light source 142 varies depending on environmental temperature and other factor. In order to suppress such a fluctuation in the light output, it is sufficient to control the vertical cavity surface-emitting laser of the displacement detection light source 122 or the reference position detection light source 142 in such a manner that its light output can be kept constant.

The vertical cavity surface-emitting laser 122 of the displacement detection light source is controlled with a sum of outputs from all the opto-electric conversion elements of the displacement detection photo-detector 134 being used as a power monitor signal. Moreover, the vertical cavity surface-emitting laser 142 of the reference position detection light source 142 is controlled with a sum of outputs from the photo-detector 154 and the two dummy photo-detectors 156 being used as a power monitor signal, for example.

That is, by controlling the light outputs from the vertical cavity surface-emitting lasers 122 and 142 in such a manner that each power monitor signals become constant, the light outputs from the displacement detection light source 122 and the reference position detection light source 142 in the sensor head 100D can be stabilized. As a result, in the optical linear encoder using the sensor head 100D, both the displacement detection signal and the reference position detection signal are extremely stabilized.

Although the above has described the embodiments according to the present invention with reference to the accompanying drawings, the present invention is not restricted thereto, and various modifications or variations can be carried out without departing from the scope of the invention.

For example, the displacement detection light source 122 or the light source 162 that acts as both the displacement detection light source and the reference position detection light source is not restricted to the vertical cavity surface-emitting laser, and an arbitrary coherent light source such as a semiconductor laser (edge emission laser), an LED or the like can be applied. In addition, the reference position detection light source 142 is not restricted to the vertical cavity surface-emitting laser, and an arbitrary light source such as a semiconductor laser (edge emission laser), an LED or the like can be applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A sensor head which constitutes an optical encoder in combination with a movable scale,
   the scale being one of a first scale including a first optical pattern and a second optical pattern that are formed on respective tracks, and a second scale including a first optical pattern and a second optical pattern that are formed on a single track,
   the sensor head comprising:
   a light source portion which emits at least one coherent light beam applied to the scale;
   a first photo-detector which detects the light reflected by the first optical pattern;
   at least a second photo-detector which detects the light reflected by the second optical pattern; and
   a plate-like substrate supporting the light source portion, the first photo-detector and the second photo-detector,
   the sensor head having a first axis (x axis) parallel to a movement direction of the scale, a second axis (y axis) orthogonal to the x axis and parallel to a pattern surface of the scale, and a third axis (z axis) orthogonal to both the x axis and the y axis,
   the first photo-detector having opto-electric conversion elements aligned along the x axis, the second photo-detector having an opto-electric conversion element, the light source portion, the first photo-detector and the second photo-detector being on a plane of the substrate, the light source portion emitting the light beam vertically to the plane of the substrate, and a straight line connecting the center of the first photo-detector with the center of the second photo-detector crossing both the x axis and the y axis, so that the sensor head is adaptable to both the first scale and the second scale.

2. The sensor head according to claim 1, wherein the first photo-detector and the second photo-detector are arranged so that a projection of the first photo-detector projected onto a yz plane orthogonal to the x axis is apart from a projection of the second photo-detector projected onto the same and a projection of the first photo-detector projected onto a zx plane orthogonal to the y axis is apart from a projection of the second photo-detector projected onto the same.

3. The sensor head according to claim 1, wherein the light source portion includes a first light source which emits the light beam applied to the first optical pattern, and a second light source which emits the light beam applied to the second optical pattern.

4. The sensor head according to claim 3, wherein each of the first light source and the second light source comprises a surface-emitting laser.

5. The sensor head according to claim 3, wherein the first photo-detector is positioned on the outer side of the first light source along the y axis, and the second photo-detector is positioned on the outer side of the second light source along the y axis.

6. The sensor head according to claim 3, wherein the sensor head includes two second photo-detectors, and a straight line connecting the center of the first photo-detector with a midpoint of the centers of the two second photo-detectors crosses both the x axis and the y axis.

7. The sensor head according to claim 1, wherein the light source portion comprises a light source which emits the light beam applied to the first and second optical patterns.

8. The sensor head according to claim 7, wherein the light source comprises a surface-emitting laser.

9. The sensor head according to claim 1, wherein the substrate comprises a semiconductor substrate, and the photo-detectors are monolithically formed on the semiconductor substrate.

10. The sensor head according to claim 1, further comprising a pair of first dummy photo-detectors located on both sides of the first photo-detector along the x axis.

11. The sensor head according to claim 1, further comprising a pair of second dummy photo-detectors located on both sides of the second photo-detector along the x axis.

12. An optical encoder comprising:
    a movable scale; and
    a sensor head which detects movement of the scale,
    the optical encoder having a first axis (x axis) parallel to a movement direction of the scale, a second axis (y axis) orthogonal to the x axis and parallel to a pattern surface of the scale, and a third axis (z axis) orthogonal to both the x axis and the y axis,
    the scale being one of a first scale including a first optical pattern and a second optical pattern that are formed on respective tracks, and a second scale including a first optical pattern and a second optical pattern that are formed on a single track,
    the sensor head comprising:
    a light source portion which emits at least one coherent light beam applied to the scale;
    a first photo-detector which detects the light reflected by the first optical pattern;
    at least a second photo-detector which detects the light reflected by the second optical pattern; and
    a plate-like substrate supporting the light source portion, the first photo-detector and the second photo-detector,
    the first photo-detector having opto-electric conversion elements aligned along the x axis, the second photo-detector having an opto-electric conversion element, the light source portion, the first photo-detector and the second photo-detector being on a plane of the substrate, the light source portion emitting the light beam vertically to the plane of the substrate, the first optical pattern and the second optical pattern being formed on a plane of the scale, the scale and the sensor head being arranged in the positional relationship that the plane of the scale and the plane of the substrate are parallel to each other, a straight line connecting the center of the first photo-detector with the center of the second photo-detector crossing both the x axis and the y axis.

13. The optical encoder according to claim 12, wherein the first photo-detector and the second photo-detector are arranged so that a projection of the first photo-detector projected onto a yz plane orthogonal to the x axis is apart from a projection of the second photo-detector projected onto the same, and a projection of the first photo-detector projected onto a zx plane orthogonal to the y axis is apart from a projection of the second photo-detector projected onto the same.

14. The optical encoder according to claim 12, wherein the light source portion, the first optical pattern and the first photo-detector are arranged so that a Talbot image is formed on the first photo-detector.

15. The optical encoder according to claim 12, wherein the first optical pattern is for detection of a displacement of the scale, and the second optical pattern is for detection of a reference position of the scale.

16. The optical encoder according to claim 15, wherein the optical pattern for detection of the reference position comprises a holographic lens pattern.

17. The optical encoder according to claim 12, wherein the light source portion has a first light source which emits the light beam applied to the first optical pattern and a second light source which emits the light beam applied to the second optical pattern.

18. The optical encoder according to claim 17, wherein a spot of a first light beam formed on the scale by the first light source is apart from a spot of a second light beam formed on the same by the second light source.

19. The optical encoder according to claim 18, wherein a spot of a first light beam formed on the substrate by the first light source and a spot of a second light beam formed on the same by the second light source after passing through the scale are apart from each other.

20. The optical encoder according to claim 17, wherein each of the first light source and the second light source comprises a surface-emitting laser.

21. The sensor head according to claim 17, wherein the first photo-detector is positioned on the outer side of the first light source along the y axis, and the second photo-detector is positioned on the outer side of the second light source along the y axis.

22. The sensor head according to claim 17, wherein the sensor head includes two second photo-detectors, and a straight line connecting the center of the first photo-detector with a midpoint of the centers of the two second photo-detectors crosses both the x axis and the y axis.

23. The optical encoder according to claim 12, wherein the light source portion comprises a light source which emits the light beam applied to the first optical pattern and the second optical pattern.

24. The optical encoder according to claim 23, wherein the light source comprises a surface-emitting laser.

25. The optical encoder according to claim 12, wherein the substrate comprises a semiconductor substrate, and the photo-detectors are monolithically formed on the semiconductor substrate.

26. The sensor head according to claim 12, further comprising a pair of first dummy photo-detectors located on both sides of the first photo-detector along the x axis.

27. The sensor head according to claim 12, further comprising a pair of second dummy photo-detectors located on both sides of the second photo-detector along the x axis.

28. A sensor head which constitutes an optical encoder in combination with a movable scale including a first optical pattern and a second optical pattern, the sensor head comprising:

a light source portion for emitting at least one coherent light beam applied to the scale;

a first photo-detector for detecting the light reflected by the first optical pattern; and at least a second photo-detector for detecting the light reflected by the second optical pattern, a straight line connecting the center of the first photo-detector with the center of the second photo-detector crossing both a first axis parallel to a movement direction of the scale and a second axis orthogonal to the first axis and parallel to a pattern surface of the scale.

29. The sensor head according to claim 28, wherein the light source portion includes a first light source which emits the light beam applied to the first optical pattern, and a second light source which emits the light beam applied to the second optical pattern.

30. The sensor head according to claim 28, wherein the light source portion comprises a light source which emits the light beam applied to the first optical pattern and the second optical pattern.

31. The sensor head according to claim 28, further comprising a pair of first dummy photo-detectors located on both sides of the first photo-detector along the x axis.

32. The sensor head according to claim 28, further comprising a pair of second dummy photo-detectors located on both sides of the second photo-detector along the x axis.

33. An optical encoder comprising:

a movable scale; and a sensor head for detecting movement of the scale, the scale including a first optical pattern and a second optical pattern, the sensor head comprising:

a light source portion for emitting at least one coherent light beam applied to the scale;

a fist photo-detector for detecting the light reflected by the first optical pattern; and at least a second photo-detector for detecting the light reflected by the second optical pattern, a straight line connecting the center of the first photo-detector with the center of the second photo-detector crossing both a first axis parallel to a movement direction of the scale and a second axis orthogonal to the first axis and parallel to a pattern surface of the scale.

34. The optical encoder according to claim 33, wherein the light source portion includes a first light source which emits the light beam applied to the first optical pattern, and a second light source which emits the light beam applied to the second optical pattern.

35. The optical encoder according to claim 33, wherein the light source portion comprises a light source which emits the light beam applied to the first optical pattern and the second optical pattern.

36. The optical encoder according to claim 33, further comprising a pair of first dummy photo-detectors located on both sides of the first photo-detector along the x axis.

37. The optical encoder according to claim 33, further comprising a pair of dummy second dummy photo-detectors located on both sides of the second photo-detector along the x axis.

* * * * *